Patented Apr. 6, 1948

2,439,226

UNITED STATES PATENT OFFICE 2,439,226

COPOLYMERS OF FUMARODINITRILE AND ALPHA-SUBSTITUTED STYRENES

Raymond B. Seymour, Dayton, Ohio, assignor to Monsanto Chemical Company, St. Louis, Mo., a corporation of Delaware No Drawing. Application February 3, 1944, Serial No. 520,920

8 Claims. (Cl. 260—78.5)

The present invention relates to copolymers of fumaronitrile, more particularly to copolymers of fumaronitrile with certain alpha-substituted vinyl aromatic compounds, and to a method of preparing the same.

An object of the present invention is to provide for the plastics and coatings industries new, resinous products possessing a high degree of thermal stability and resistance to solvents.

I have found that valuable copolymerization products may be obtained by polymerizing fumaronitrile with at least one alpha-alkyl or alpha-aryl substituted vinyl aromatic compound having the general formula:

$$\text{Ar. CX:CH}_2$$

wherein Ar stands for a substituted or unsubstituted aromatic hydrocarbon radical such as phenyl, naphthyl, xenyl, etc., and X stands for an alkyl radical of from 1 to 5 carbon atoms, a phenyl radical or a phenyl radical containing 1 or more alkyl radicals of from 1 to 5 carbon atoms substituted in the nucleus. As examples of alpha-alkyl or alpha-aryl substituted vinyl aromatic compounds having the above general formula may be mentioned: alpha-methylstyrene, alpha-phenylstyrene, alpha-tolylstyrene, alpha-xylylstyrene, alpha-(4-ethylphenyl)styrene, 1-(alpha-methyl)vinylnaphthalene, 2-(alpha-ethyl)vinylnaphthalene, 4-(alpha-methyl)vinylbiphenyl, alpha-methyl-para-ethyl-styrene, alpha,para-dimethylstyrene, alpha-methyl-para-chlorostyrene, alpha-ethyl-para-fluorostyrene, alpha-isopropyl-para-chlorostyrene, alpha-methyl-para-hydroxystyrene, alpha-amyl-para-chlorostyrene, alpha-methyl-ortho-bromostyrene, alpha-methyl-meta-fluorostyrene, alpha-ethyl-ortho-cyanostyrene, alpha-ethyl-meta-aminostyrene, alpha-methyl-para-nitrostyrene, alpha-methyl-para-iodostyrene, alpha,ortho-dimethylstyrene, alpha,-ortho-dietheylstyrene, alpha,ortho-di-isopropylstyrene, alpha,ortho-di-isobutylstyrene, alpha,-ortho-di-tert.-amylstyrene, alpha,meta-dimethylstyrene, alpha,meta-diethylstyrene, alpha,-meta-di-isopropylstyrene, alpha,meta-di-tert.-butylstyrene, alpha,meta-di-isoamylstyrene, alpha-n-propyl-para-isopropylstyrene, alpha-ethylstyrene, alpha-n-propylstyrene, alpha-isopropylstyrene, alpha-n-butylstyrene, alpha-isobutylstyrene, alpha-tert.-butylstyrene, alpha-n-amylstyrene, alpha-isoamylstyrene, alpha-tert.-amylstyrene, etc.

While it is known that vinyl aromatic compounds such as styrene or the nuclearly substituted styrenes readily undergo polymerization to give useful resinous or plastic materials, the alpha-alkyl vinyl aromatic compounds such as those mentioned above do not polymerize when subjected to ordinary polymerizing conditions. While polymerization of some of these compounds, for example, alpha-methylstyrene has been previously effected by the use of acidic catalysts, the polymers thereby obtained are unsuitable for the preparation of molded products.

It is also known that resinous products may be obtained by polymerizing alpha,para-dimethylstyrene with acrylonitrile as disclosed in U. S. Patent No. 2,310,961 to Edward L. Kropa. A vinyl compound like acrylonitrile may polymerize alone, however; so that it is not surprising that resinous products are obtained from a monomeric mixture consisting of acrylonitrile and alpha,-para-dimethylstyrene. On the other hand, neither fumaronitrile nor the alpha-alkyl substituted styrenes having the general formula shown above undergo polymerization or auto-condensation when subjected, alone, to ordinary polymerizing conditions.

I have now made the surprising discovery that in admixture with each other comparatively stable fumaronitrile and the likewise stable alpha-alkyl subsituted styrenes readily copolymerize to yield uniform, clear, hard resins possessing valuable properties. The interpolymerization products so obtained, which are nitrogen-containing materials, are characteristically tough and hard masses, which vary from clear, water-white to somewhat yellowish materials, depending upon the specific conditions of polymerization and the nature of the individual copolymerizing components. Very valuable products are obtained by polymerizing a ternary mixture comprising fumaronitrile, an alpha-alkyl substituted vinyl aromatic compound, and a polymerizable compound such as styrene, acrylonitrile, methyl methacrylate, vinyl acetate, methyl isopropenyl ketone, etc.

The present copolymers are particularly suitable for thermoplastic molding and when subjected to heat and pressure as by molding or extruding while in a plastic condition there are obtained molded bodies which are characterized by high thermal stability, excellent mechanical properties and good solvent-resistance. The molded bodies are light-fast, they possess a glass-like transparency and they remain substantially unaffected by immersion in water for long periods of time. They have good electrical properties, and may therefore be employed as wire-coating compositions.

Cast products, obtained by copolymerization of fumaronitrile with the present alpha-alkyl vinyl aromatic compounds to a viscous syrup, pouring the syrup into sheets, blocks or tubes and continuing the polymerization, also possess the desirable properties mentioned above. Cast sheets of the present copolymers are advantageously employed as glass-substitutes, for windshields, etc. The present copolymers, dissolved in suitable solvents in the presence or absence of plasticizers, may be used as lacquers or for the casting of films.

In general, copolymerization of the alpha-alkyl vinyl aromatic compounds with, say, from 10% to 40% by weight based upon the interpolymer of the unsaturated nitrile results in the production of polymerization products possessing an impact resistance and flexural strength which far exceeds that of polystyrene or of copolymers of styrene. The heat distortion point of the present copolymers greatly exceeds that of polystyrene.

For the preparation of clear, transparent products, I prefer to employ the fumaronitrile in amounts of, say, from 25% to 40% of the total monomeric mixture, although I may use from 5% to 50% of the nitrile. Generally, the use of less than 25% of fumaronitrile results in the production of turbid or opaque interpolymerization products. However, the opacity may be eliminated in fumaronitrile concentrations of less than 25% by incorporating into the monomeric mixture a vinyl compound as a third component of copolymerization such as styrene, derivatives of acrylic acid, e. g., methyl methacrylate, acrylonitrile or methacrylic anhydride, vinyl acetate, maleic anhydride, etc. The third component may be employed in such amounts as to give, say, at least a 30% total concentration of the nitrile and said third component in the monomeric mixture. Particularly good results are obtainable by using a mixture of fumaronitrile and acrylonitrile in the copolymerization with the alpha-alkyl vinyl aromatic compound in order to secure a combination of desirable properties. For example, while the copolymer of alpha,para-dimethylstyrene with acrylonitrile has good mechanical properties, it does not have the high thermal resistance of the alpha-para-dimethylstyrene-fumaronitrile copolymer, which copolymer, however, has mechanical properties that are somewhat inferior to those of the acrylonitrile copolymer. A blending of both the heat-resisting properties and the desirable mechanical properties is achieved by copolymerization of alpha,para-dimethylstyrene with a mixture of acrylonitrile and fumaronitrile in a total nitrile concentration of, say, 30%.

As will be hereinafter disclosed, the copolymerization of alpha-alkyl vinyl aromatic compounds with the present unsaturated nitriles may be effected by a variety of polymerization procedures known to those skilled in the art. Polymerization may be effected in mass, in aqueous emulsion or suspension, or in a solvent medium such as 1,4-dioxane, either in the presence or absence of a polymerizing catalyst. During or prior to the polymerization there may be added to the polymerizing mixture or to the initial mixture of monomers such materials as plasticizers, colors, fillers, etc.

The invention is further illustrated, but not limited, by the following examples:

*Example 1*

A mixture consisting of 70 parts of alpha,para-dimethylstyrene and 30 parts of fumaronitrile was polymerized at a temperature of 70° C. for 6 days. There was thus obtained a hard, slightly yellow, transparent resin having a softening point of above 267° C. as determined by employing the Maquenne block method. The resin is soluble in acetone, swollen by dioxane, ethyl acetate, ethyl chloride and carbon tetrachloride, and insoluble in benzene. A clear flexible, tough film was prepared by evaporating a lacquer containing 25 parts of dibutyl phthalate, 75 parts of the copolymer and 1,000 parts of acetone. The film had extremely good heat- and solvent-resistance. It did not soften even at a temperature of 270° C.

*Example 2*

A mixture consisting of 90 parts of alpha,para-dimethylstyrene and 10 parts of fumaronitrile was polymerized at a temperature of 70° C. for 3 days and then at a temperature of 100° C. for 4 days. The product, which was obtained by dissolving the polymerized mass in acetone and then precipitating it from alcohol, had a nitrogen content of 11.1%, a softening point of 260° C. and a melting point of 295° C. It was soluble only in acetone. Films of the present copolymer, prepared by casting an acetone solution of the same as in Example 1, were tough and extremely heat-resistant.

*Example 3*

A mixture consisting of 35 parts of alpha,para-dimethylstyrene, 35 parts of styrene and 30 parts of fumaronitrile was polymerized for 6 days at a temperature of 70° C. and then for 6 days at a temperature of 100° C. The resulting product was a hard, water-clear resin having a softening point of 225° C. and a melting point of over 265° C. It was soluble in acetone, but insoluble in all other usual organic solvents. Because of its high softening point and solvent resistance, it is of value in acetone solution, either in presence or absence of plasticizers, for the production of cast films or as a resinous base for lacquers.

*Example 4*

A mixture consisting of 80 parts of alpha,para-dimethylstyrene and 20 parts of fumaronitrile was polymerized for 3 days at a temperature of 70° C. and then for 6 days at a temperature of 100° C. There was thus obtained a hard, yellowish, slightly opaque resin having a softening point of 260° C. and a melting point of 295° C. It was soluble in acetone, but insoluble in other customary organic solvents. Upon analysis, the solvent-purified copolymer showed a nitrogen content of 11%, while the calculated nitrogen content of a 4:1 alpha,para-dimethylstyrene-fumaronitrile copolymer is only 7.2%. This indicates that a proportionately greater amount of fumaronitrile is present in the final product than would be indicated from the initial monomeric mixture.

*Example 5*

A mixture consisting of 70 parts of alpha,para-dimethylstyrene, 15 parts of fumaronitrile and 15 parts of acrylonitrile was polymerized for 3 days at a temperature of 68° C. and then for 6 days at a temperature of 100° C. The resulting product was a hard, light yellow, transparent resin having a softening point of 215° C., a melting point of above 265° C. and an alcohol-soluble content of 10.9%. The copolymer was soluble in acetone and ethylene dichloride, but insoluble in the other customarily employed organic solvents. A molded test-specimen of the solvent-purified resin was found to have very good mechanical properties and high thermal stability.

Example 6

A mixture consisting of 70 parts of alpha-methyl-styrene and 30 parts of fumaronitrile was polymerized for 6 days at a temperature of 70° C. The resulting copolymer had a softening point of above 270° C. and was soluble only in acetone. Strong, tough films were obtained by casting an acetone solution of the present resin, employing esters of phthalic acid as plasticizers.

Example 7

A mixture consisting of 54 parts of alpha-methyl-styrene, 23 parts of fumaronitrile and 23 parts of methyl acrylate was polymerized for 6 days at a temperature of 70° C. The resulting copolymer had a softening point of 173° C., a melting point of 225° C., and was soluble only in acetone.

Example 8

A mixture consisting of 70 parts of alpha-methyl-styrene, 15 parts of acrylonitrile and 15 parts of fumaronitrile was polymerized for 6 days at a temperature of 70° C. The resulting copolymer had a softening point of 143° C., a melting point of 165° C., and was soluble only in acetone.

Example 9

This example shows the polymerization of a mixture of fumaronitrile and alpha-methylstyrene in solution by a continuous process. A mixture consisting of 70 parts of alpha-methylstyrene and 30 parts of fumaronitrile was dissolved in 800 parts of alcohol. The resulting mass was subjected to polymerization at a temperature of 50° C., and as the copolymer which was formed precipitated from the alcohol, it was removed from the reaction mixture. The concentration of the fumaronitrile and the alpha-methylstyrene in the monomeric mixture was maintained at a substantially constant ratio during the reaction by addition of the monomers to the polymerizing mass in the proportion to which they were consumed by the copolymerization. The copolymer of fumaronitrile and alpha-methylstyrene which was obtained in this manner was a hard, tough, substantially colorless and transparent resinous mass of very good mechanical properties and high thermal stability.

Example 10

A mixture consisting of 70 parts of alpha,para-dimethylstyrene and 30 parts of fumaronitrile was polymerized in alcohol solution as described in Example 9. There was obtained a hard, substantially colorless and transparent copolymer having a softening point of 248° C. and a melting point of 280° C. It was soluble in acetone and ethylene dichloride but insoluble in the other customarily employed organic solvents.

Example 11

64 grams of a mixture consisting of 70 parts of alpha,para-dimethylstyrene and 30 parts of fumaronitrile was emulsified to a fine milk in a mixture comprising 35 ml. of MacIlvaine's buffer solution held at a pH of 4 or slightly less, 35 ml. of a 5% aqueous solution of Gardinol WA, 2.0 grams of sodium perborate and 1.5 grams of carbon tetrachloride. The mixture was shaken at a temperature of 35° C. for 4 days. The emulsion was then broken by pouring it into alcohol and the precipitated polymer was filtered, washed with water and dried. There was thus obtained an 85% yield of a hard, white, powdery copolymer which was soluble only in acetone.

Example 12

When a mixture consisting of 25 parts of alpha-methylstyrene, 30 parts of fumaronitrile and 45 parts of styrene was submitted to emulsion polymerization by the process described in Example 11, there was obtained a 95% yield of a hard, white, powdery copolymer having a softening point of 225° C. and soluble only in acetone.

Example 13

A mixture consisting of 70 parts of alpha-phenylstyrene and 30 parts of fumaronitrile was polymerized at a temperature of 70° C. for 10 days. The hard, substantially colorless and transparent resinous mass which was thus obtained was soluble only in acetone and possessed high thermal stability.

The copolymerization of fumaronitrile with other alpha-alkyl or alpha-arylstyrenes besides those disclosed in the above examples also results in the production of hard, transparent to slightly opaque resinous products having good mechanical and thermal properties. Instead of using alpha-methylstyrene, alpha-phenylstyrene or alpha,para-dimethylstyrene as shown above, I may use other alpha-alkyl or alpha-aryl derivatives of vinyl aromatic compounds, for example, alpha-ethylstyrene, alpha, para-diethylstyrene, alpha-tolylstyrene, 1-(alpha-methylvinyl)naphthalene, 4-(alpha-methylvinyl)biphenyl, etc., as the alpha-alkyl or alpha-aryl substituted vinyl aromatic component of the monomeric mixture.

While this invention contemplates principally the copolymers from a binary polymerizable mixture of alpha-alkyl or alpha-aryl derivatives of vinyl aromatic compounds and fumaronitrile, it also includes copolymers from ternary or polynary polymerizable mixtures comprising one of the herein defined alpha-substituted vinyl aromatic compounds, fumaronitrile, and one or more polymerizable materials such as butadiene, vinyl chloride, methyl methacrylate, styrene, maleic anhydride, etc.

My new copolymers may be further modified in their physical properties and general appearance and utility by incorporating therein various additives such as coloring agents, fillers and plasticizers. Such materials may be added in any expedient manner, before or after copolymerization, depending upon the effect such materials may have on the polymerizing rate of the monomers or on the properties desired in the finished copolymers.

Other modes of applying the principle of my invention may be employed instead of those explained, change being made as regards the polymerization process, the temperatures, reaction media and the proportion of monomeric reactants employed, provided said reactants comprise a mixture of fumaronitrile and one or more of the above-defined alpha-alkyl or alpha-aryl substituted vinyl aromatic compounds in presence or absence of modifiers, other materials which are polymerizable, etc.

What I claim is:

1. A solid resinous material consisting of the interpolymer of a mixture of 5% to 40% by weight of fumarodinitrile and the remainder consisting of a compound of the group of alpha-substituted styrenes consisting of alpha-methylstyrene, alpha-para-dimethylstyrene and alpha-phenylstyrene.

2. The process for producing a solid resinous material which comprises polymerizing a mixture consisting of fumarodinitrile and a compound of the group of alpha-substituted styrenes consisting of alpha-methylstyrene, alpha-para-dimethyl-styrene, and alpha-phenylstyrene, said mixture containing between 5% and 40% by weight of said fumarodinitrile, said mixture being heated to form an interpolymer.

3. A solid resinous material consisting of the interpolymer of a mixture consisting of alpha-methylstyrene and 10% to 40% by weight of fumarodinitrile.

4. A solid resinous material consisting of the interpolymer of a mixture consisting of alpha-para-dimethylstyrene, and 10% to 40% by weight of fumarodinitrile.

5. A solid resinous material consisting of the interpolymer of a mixture consisting of alpha-phenylstyrene and 5% to 40% by weight of fumarodinitrile.

6. The process for producing a solid, resinous material which comprises heating a mixture consisting of fumarodinitrile and alpha-methylstyrene to form an interpolymer, said mixture containing between 5% and 40% by weight of fumarodinitrile.

7. The process for producing a solid, resinous material which comprises heating a mixture consisting of fumarodinitrile and alpha,para-dimethylstyrene to form an interpolymer, said mixture containing between 5% and 40% by weight of fumarodinitrile.

8. The process for producing a solid, resinous material which comprises heating a mixture consisting of fumarodinitrile and alpha-phenylstyrene to form an interpolymer, said mixture containing between 5% and 40% by weight of fumarodinitrile.

RAYMOND B. SEYMOUR.

REFERENCES CITED

The following references are of record in the file of this patent:

UNITED STATES PATENTS

| Number | Name | Date |
| --- | --- | --- |
| 2,047,398 | Voss et al. | July 14, 1936 |
| 2,310,961 | Kropa | Feb. 16, 1943 |
| 2,324,426 | Robie | July 13, 1943 |

FOREIGN PATENTS

| Number | Country | Date |
| --- | --- | --- |
| 814,093 | France | Mar. 8, 1937 |

OTHER REFERENCES

Stanley, Art, in Chemistry and Industry, Dec. 16, 1939, pp. 1080–1083.